US006065198A

United States Patent [19]

[11] Patent Number: 6,065,198

[45] Date of Patent: May 23, 2000

Vitous et al.

[54] TOOLS FOR INSTALLING AN OIL SEAL

[75] Inventors: Stephan A. Vitous, Howell; Mark A. Froelich, Onsted, both of Mich.

[73] Assignee: DaimlerChrysler Corporation, Auburn Hills, Mich.

[21] Appl. No.: 09/204,119

[22] Filed: Dec. 2, 1998

[51] Int. Cl.[7] .......... B23P 6/00

[52] U.S. Cl. .......... 29/258; 29/270; 29/402.02

[58] Field of Search .......... 29/256, 258, 266, 29/270, 402.02, 426.4; 277/309, 551

[56] References Cited

U.S. PATENT DOCUMENTS

| | | | |
|---|---|---|---|
| 1,788,496 | 1/1931 | Smith et al. . | |
| 1,956,843 | 5/1934 | Wheeler | 286/31 |
| 3,304,601 | 2/1967 | Torres | 29/261 |
| 3,564,696 | 2/1971 | Shepanski | 29/235 |
| 3,651,557 | 3/1972 | Bagley | 29/260 |
| 3,744,598 | 7/1973 | Hanke et al. | 188/296 |
| 3,755,875 | 9/1973 | Staab | 29/240 |
| 3,909,916 | 10/1975 | Neff et al. | 29/235 |
| 4,470,185 | 9/1984 | Weber | 29/235 |
| 4,502,197 | 3/1985 | Harder | 29/259 |
| 4,551,898 | 11/1985 | Provost | 29/235 |
| 4,841,620 | 6/1989 | Kadlub | 29/426.4 |
| 4,989,312 | 2/1991 | Maddalena | 29/259 |
| 5,009,434 | 4/1991 | Nash et al. | 277/1 |
| 5,013,050 | 5/1991 | Lansdale | 277/9.5 |
| 5,033,177 | 7/1991 | Gathright et al. | 29/264 |
| 5,052,695 | 10/1991 | Curtis | 277/9.5 |
| 5,349,736 | 9/1994 | Rubino | 29/426.5 |
| 5,692,282 | 12/1997 | Baca | 29/235 |
| 5,709,018 | 1/1998 | Dugan | 29/235 |
| 5,893,202 | 4/1999 | Graham et al. | 29/402.02 |

*Primary Examiner*—David P. Bryant
*Assistant Examiner*—Essama Omgba
*Attorney, Agent, or Firm*—Lawrence J. Shurupoff

[57] ABSTRACT

A sealing element which forms a seal between a groove and an outer end of a crankshaft is installed by the use of a guide plate, an adapter and a press. The sealing element can be stretched over a frustoconical wall of the guide plate and slid along the cylindrical wall thereof on the outer end of the crankshaft. An adapter is then secured to the outer end of the crankshaft so that the press may be engaged over the adapter in sliding contact therewith to move the sealing element along the outer end of the crankshaft and into the groove. The sealing element may be removed from the groove by a puller. A rim of the puller is aligned with the sealing element as a drill is extended through passages in the rim of the puller to form holes in the sealing element. Screws are extended through the passages and self-tap into the holes formed in the sealing element. The puller is then withdrawn to withdraw the seal from the groove.

5 Claims, 5 Drawing Sheets

TOOLS FOR INSTALLING AN OIL SEAL

This invention relates generally to oil seal installation and removal tools, and more particularly to tools for installing and removing an oil seal of the type adapted to prevent leakage around a crankshaft of an automotive vehicle.

BACKGROUND AND SUMMARY OF THE INVENTION

It is necessary to provide an oil seal between the crankshaft of an automotive engine and the engine block. This seal, which prevents leakage of lubricating oil from the engine, eventually wears out and must be replaced. Such seals are difficult to remove and what is needed is a tool or tools which can accomplish the removal of the seal without damaging the crankshaft.

Moreover, a particular need exists for an oil seal installation and removal tool for removing and installing seals for test and evaluation purposes. Prior removal tools damaged the delicate elastomeric seal lips and/or damaged the crankshaft thereby complicating or preventing an accurate analysis and evaluation of the seal.

In accordance with the present invention, the oil seal may be removed by a puller which is secured to the outer end face of the crankshaft. A drill is provided to form holes in the seal casing. The puller has passages to closely and accurately guide the drill. The drill is closely confined in the guide passages so that it will form each hole accurately and will not walk away or become misaligned. Screws are then inserted through the passages and threaded into the holes in the seal. The puller is then withdrawn from the crankshaft to withdraw the seal which is attached to the puller by the screws. Preferably the screws are of the self-tapping type.

This invention also includes tools for installing a shaft seal such as an oil seal to replace a worn oil seal that has been removed. For this purpose a guide plate is provided. The guide plate has a cylindrical radially outer wall of a diameter corresponding to that of the cylindrical outer end of the crankshaft. The guide plate is secured to the outer end face of the crankshaft in a position such that its cylindrical wall is concentric with and contacts the cylindrical outer end of the crankshaft. The guide plate has a frustoconical wall extending axially outwardly and radially inwardly from the cylindrical wall to enable the seal to be stretched over the frustoconical wall and then slid along the cylindrical wall of the guide plate and onto the outer surface of the crankshaft.

To press the seal further along the crankshaft and into the groove, an adapter and a press are provided. After the guide plate is removed, the adapter is secured to the outer end face of the crankshaft with its outer cylindrical wall in concentric relation with the outer end of the crankshaft. The press is engaged over the adapter and has a skirt portion in sliding contact with the outer wall of the adapter and with the outer end of the crankshaft to move the seal along the crankshaft and into the groove.

One object of this invention is to provide tools for installing and removing an oil seal having the foregoing features and capabilities.

Another object is to provide tools for installing and removing an oil seal which are rugged and durable in use, easy to operate, relatively inexpensive, and are capable of accomplishing their function without damaging the crankshaft or the seal.

These and other objects, features and advantages of the invention will become more apparent as the following description proceeds, especially when considered with the accompanying drawings.

DETAILED DESCRIPTION OF THE PREFERRED EMBODIMENT

Figure 1:
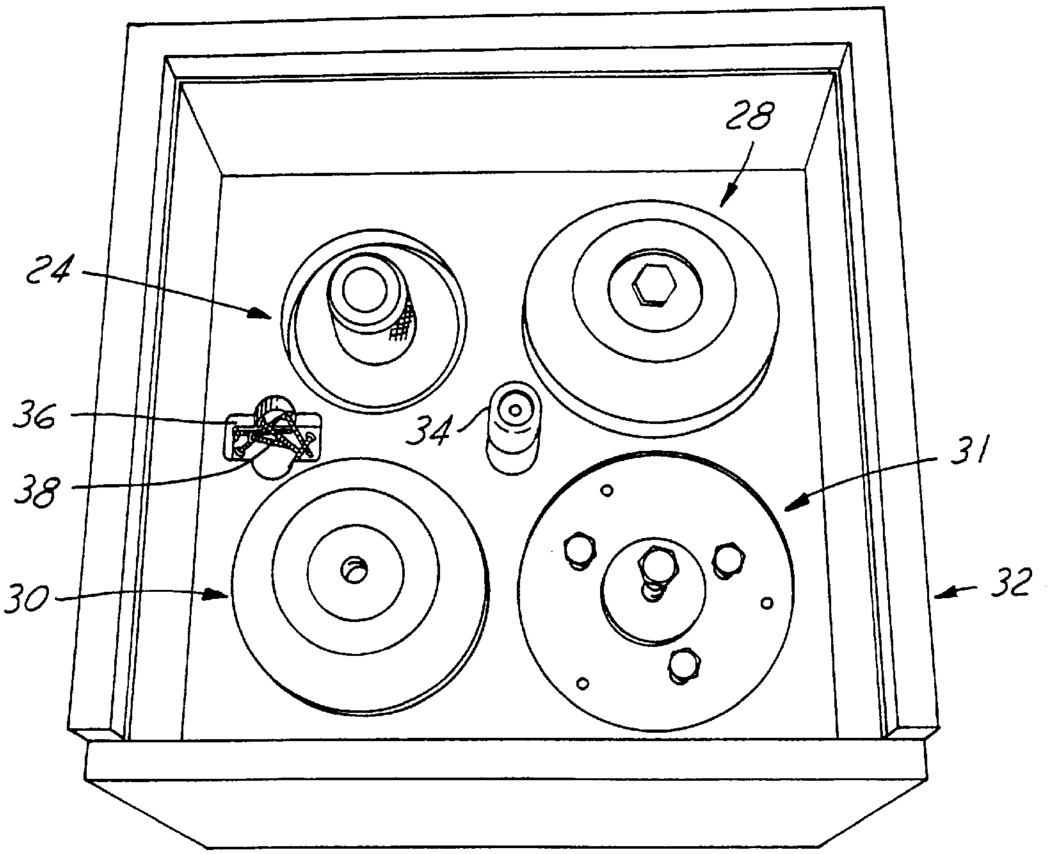
FIG. 1 is a perspective view showing a box containing a plurality of tools used to carry out the invention.

Referring now more particularly to the drawings, the tools for installing a shaft seal such as oil sealing element 20 in an annular groove 22 in an engine block 23 of an automotive vehicle, and for removing the sealing element from the groove, include a guide plate 24, an adapter 26, a press 28 or 30 and a puller 31. These tools, with the exception of the adapter 26, are shown in FIG. 1 in a toolbox 32. The adapter 26 may be stored under the press 28 and therefore cannot be seen in FIG. 1. FIG. 1 also shows a small case 34 for storing a plurality of self-tapping screws 36 and a drill 38. The screws and drill are shown outside the case in FIG. 1.

Figure 2:
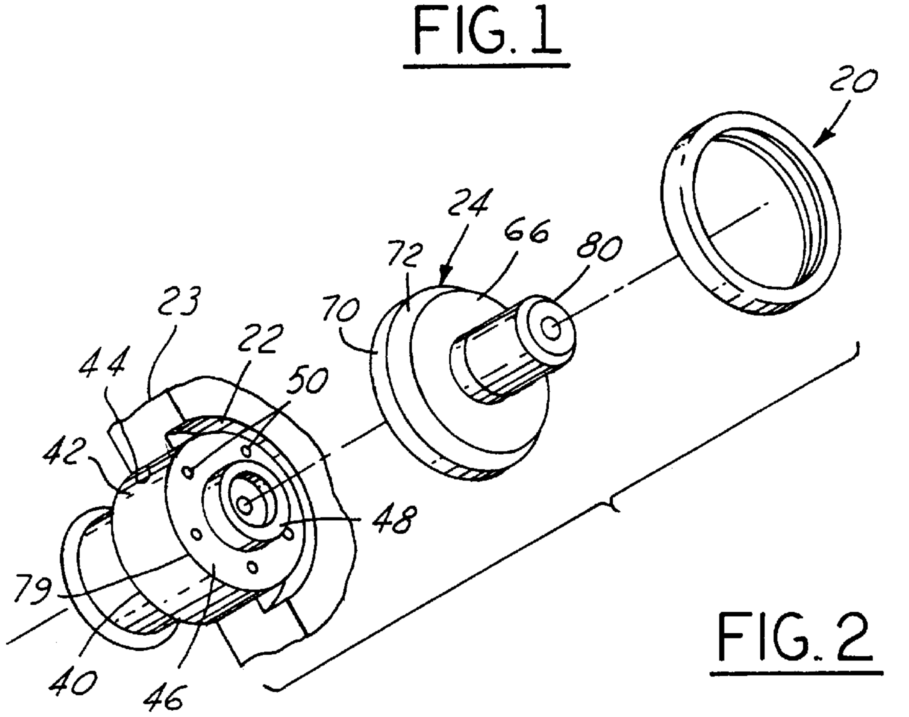
FIG. 2 is an exploded perspective view showing a crankshaft in an engine block, a sealing element and a guide plate used in a first step to install the sealing element in a groove in the engine block surrounding the crankshaft.

FIG. 2 shows a crankshaft 40 having a cylindrical outer end portion 42 extending through an opening 44 in the engine block, with the groove 22 surrounding the outer end portion of the crankshaft and opening axially outwardly. The transverse outer end face 46 of the end portion 42 of the crankshaft has an integral axially outwardly projecting center ring 48. A plurality of circumferentially spaced threaded bolt holes 50 surrounds the ring 48. Only half of the engine block surrounding the crankshaft is shown in FIG. 2 for clarity.

Figure 13:
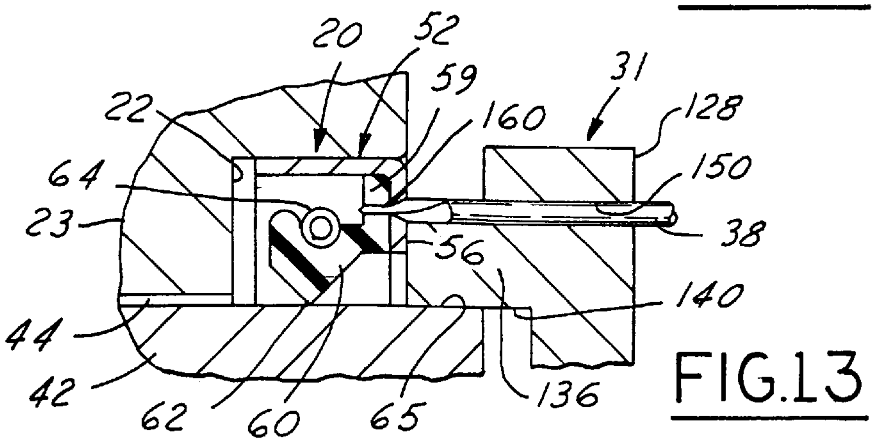
FIG. 13 illustrates the puller of this invention guiding the drill to accurately form a hole in the casing of a shaft seal.

As seen in FIG. 13, the sealing element 20 has a circular casing or frame 52 which is L-shaped in cross section, having an axially extending flange 54 engaging the outer wall of the groove and a radially extending flange 56 (see FIG. 13). Secured to the inner surface of the frame is the base 59 of a circular seal 60 of rubber or like flexible, stretchable material. The seal 60 has a circular sealing flap or lip 62 encircled by a coil spring 64 which compresses the lip against the cylindrical outer surface 65 of the outer end 42 of the crankshaft to form an oil seal between the groove and the crankshaft.

Figure 3:
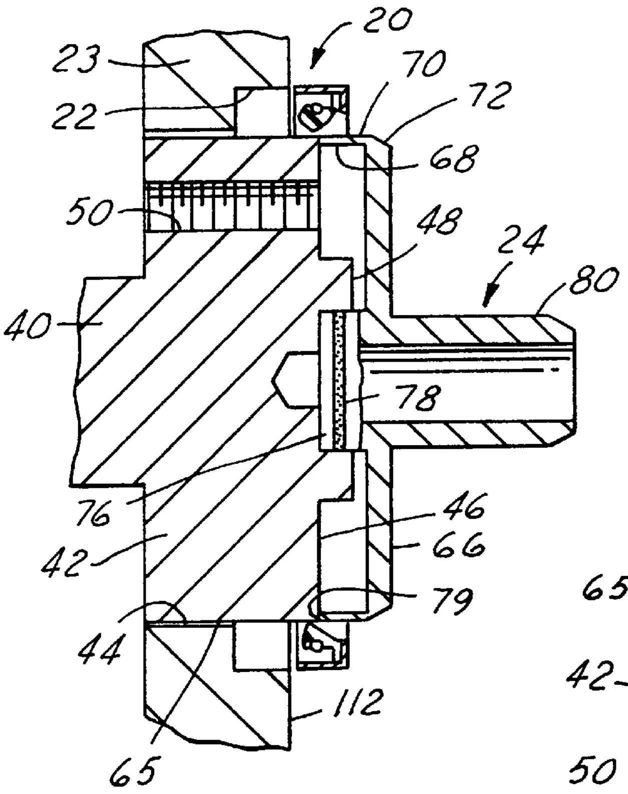
FIG. 3 is a sectional view showing the guide plate applied to the crankshaft and also showing the sealing element after it has been stretched over the guide plate into a position encircling the crankshaft.

Referring to FIGS. 2 and 3, the sealing element is installed by first employing the guide plate 24. The guide plate has a flat circular base 66 surrounded by a circular ring rim 68 extending perpendicularly to the base. The rim 68 has a cylindrical radially outer wall 70 and a frustoconical wall 72 tapering axially outwardly and radially inwardly from the outer extremity of the cylindrical wall 70. The diameter of the cylindrical wall 70 is the same as the diameter of the cylindrical outer surface 65 of the outer end 42 of the crankshaft. Inside the guide plate 24 is a circular center hub 76 of the same diameter as the inside of the ring 46 on the crankshaft. An O-ring 78 is fitted in an annular groove in the hub. A handle 77 projects from the base for manipulating the guide plate.

In the first step in the installation of the sealing element, the guide plate 24 is placed on the transverse end face 46 of the end portion 42 of the crankshaft with the center hub 76 inserted into the ring 48 on the end face 46 being held in this position by the O-ring 78 which is compressed against the radially inner surface on the ring 48. As shown in FIG. 3, the rim 68 of the guide plate has its free end abutting the end face 46 of the crankshaft in concentric relation therewith so that the cylindrical wall 70 on the rim 68 is flush with and forms a continuation of the outer surface 65 of the crankshaft.

The operator now presses the sealing element 20 along the frustoconical wall 72 of the rim of the guide plate, gradually and smoothly stretching the sealing element in the process and forcing it onto the cylindrical wall 70 and onto the outer end of the cylindrical surface 65 of the crankshaft as shown in FIG. 3. The sealing element has thus been transferred to the crankshaft but has not yet been fully seated in the groove 22. The guide plate 24 makes it possible to readily and easily stretch the sealing element over the sharp edge 79 along the end of the crankshaft. Without the guide plate, the sharp edge 79 might damage the sealing element. The guide plate can now be removed in preparation for the second and final step of the installation.

The cylindrical wall 70 is of sufficient axial length to enable an installer to view the sealing element 22 along a radial sight path between the end face 112 of the engine block and the sealing element itself to ensure the lip 62 of the sealing element enters the groove in proper position and the spring 64 is properly seated.

Figure 3A:
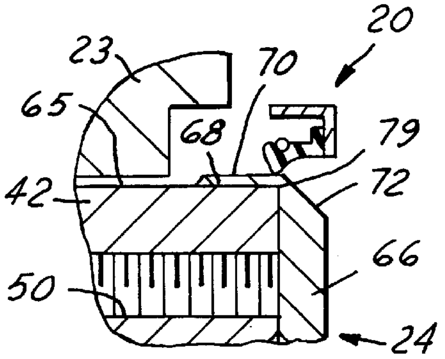
FIG. 3A is an alternate embodiment of FIG. 3 showing in fragmental view of the guide plate telescopically sleeved over the end of the crankshaft.

An alternate installation arrangement is shown in FIG. 3A wherein rim 68 of guide plate 24 is dimensioned to concentrically slide over or telescope over the end portion 42 of the crankshaft. Seal 20 is then installed as noted above, except that once seal 20 is axially positioned over the crankshaft, the guide plate 24 is axially withdrawn, allowing the seal to seat on end portion 42.

Figure 4:
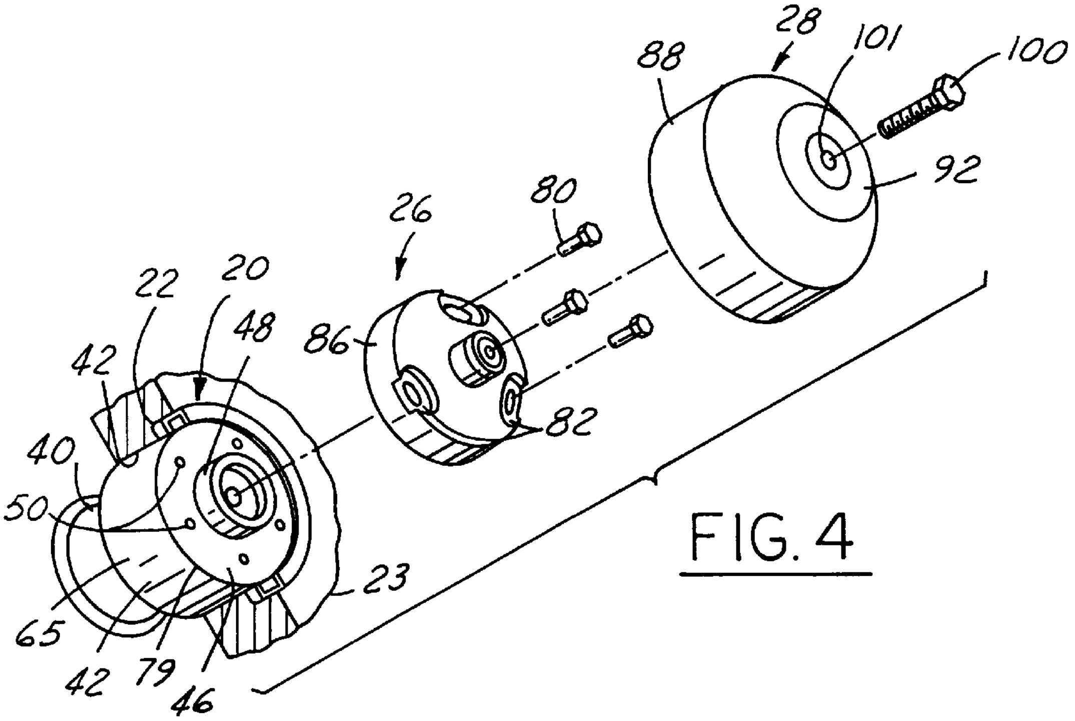
FIG. 4 is an exploded perspective view illustrating a second step in the installation of the sealing element in which an adapter and a press are employed.
Figure 5:
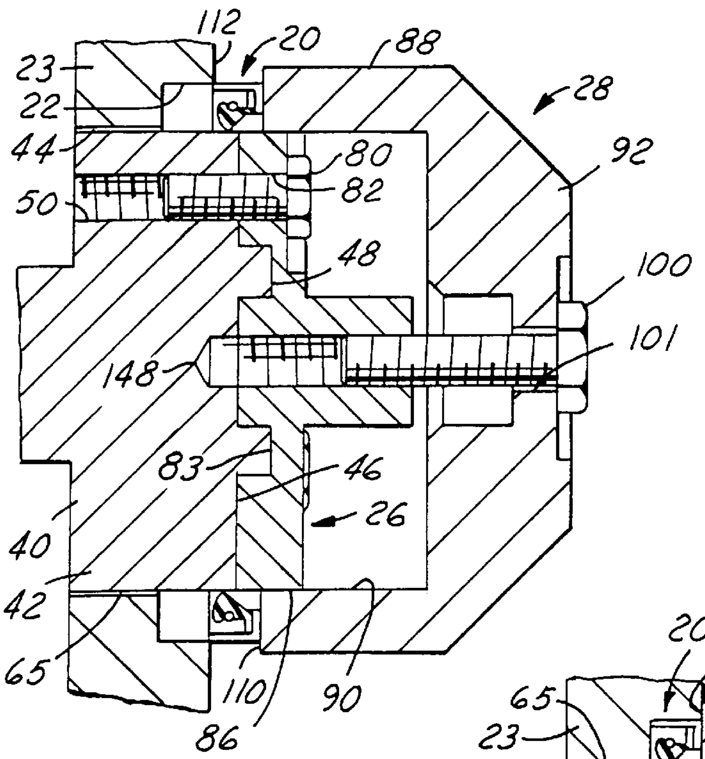
FIG. 5 is a sectional view showing the adapter secured to the end of the crankshaft and the press fitted over the adapter prior to advancing the sealing element into the groove.
Figure 6:
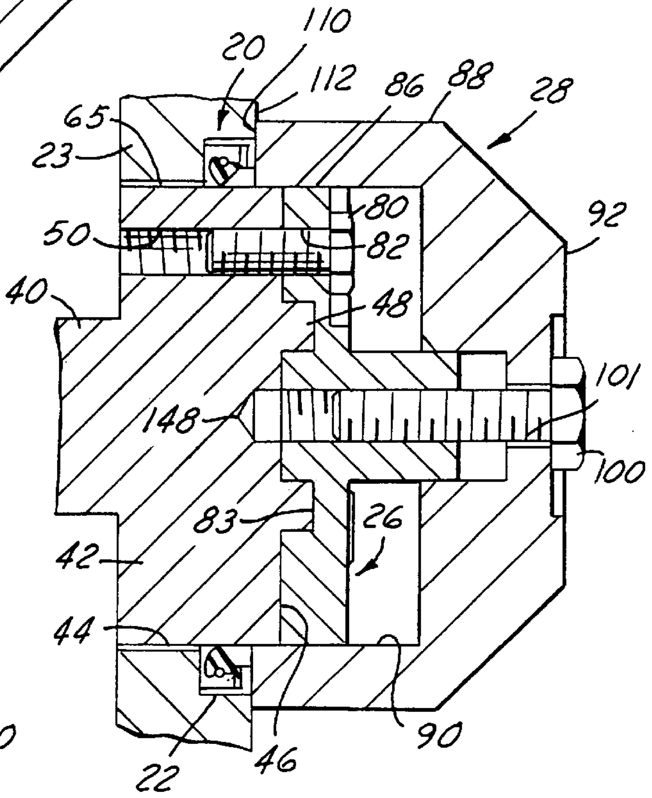
FIG. 6 is a view similar to FIG. 5 but shows the press after it has advanced the sealing element fully into the groove.

Referring to FIGS. 4–6, the adapter 26 is secured to the transverse end face 46 of the crankshaft by bolts 80 extending through holes 82 arranged in circumferentially spaced relation in the adapter, the bolts threading into the bolt holes 50 in the end face of the crankshaft. The holes in the adapter are circumferentially elongated somewhat to facilitate the attachment of the adapter to the crankshaft.

The adapter 26 is a circular plate having a circular recess 83 in the center which is adapted to receive the ring 48 on the end face 46 of the crankshaft to locate the adapter in the concentric position shown in FIG. 5. The outer periphery of the adapter indicated at 86 is cylindrical and of the same diameter as the outer surface 65 of the crankshaft and when attached to the crankshaft as in FIG. 5, the cylindrical periphery of the adapter is concentric with and forms an axial extension of the cylindrical surface 65 of the crankshaft.

The press 28 is a cup-shaped member having a cylindrical skirt 88, the inside surface 90 of which is cylindrical and of the same or slightly larger diameter as the outer periphery 86 of the adapter and the outer surface 65 of the crankshaft. The base 92 of the press has a central hole 101 through which a bolt 100 extends and threads into a threaded central hole in the adapter, thereby retaining the press on the adapter. By tightening the bolt, the press 28 is moved to the left in FIG. 5 to advance the sealing element 20 along the outer surface 65 of the crankshaft and into the groove 22.

FIG. 6 shows the press in its advanced position in which the sealing element is fully seated in the groove. In this position the transverse end surface 110 of the press engages not only the sealing element 20, but also engages or abuts the wall 112 of the engine block 23 as a stop. In FIG. 6, this end surface of the press is perpendicular to the central axis of the press and is a flat and continuous and unrecessed surface.

Figure 14:
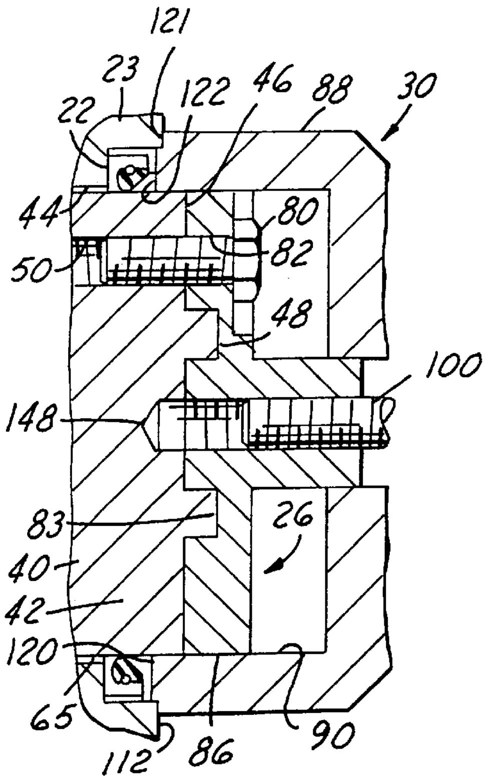
FIG. 14 is a view similar to FIG. 6 but shows a press of modified construction.
Figure 7:
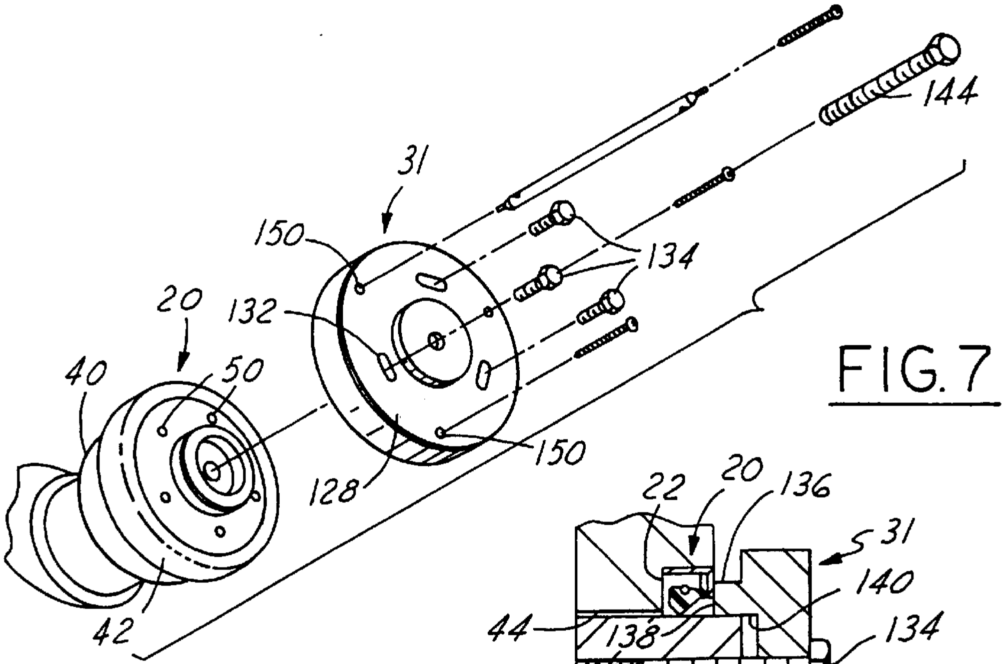
FIG. 7 is an exploded perspective view showing a puller prior to being secure to the crankshaft, the puller being used to withdraw the sealing element from the groove in the engine block.

FIG. 14 shows a modification in which the end surface 120 on the press has a recessed radially outer annular portion 121. The radially inner annular portion 122 of this surface which engages and advances the sealing element will advance the sealing element further into the groove 22 before the recessed radially outer portion 121 contacts and abuts the surface 112 of the engine block. This embodiment is particularly useful when mounting and installing a new seal over a worn crankshaft. Since the seal 20 is axially pushed further into groove 22 and further along surface 65 than with the conventional flush mounting noted above in FIG. 6, the seal lip contacts a fresh or unworn portion of the crankshaft. This prolongs the life and improves the sealing performance of the new seal 20.

With the sealing element thus fully seated and installed in the groove, the bolt 100 is loosened, the press 28 is removed and the adapter 24 is also unbolted from the end of the crankshaft and removed.

Figure 8:
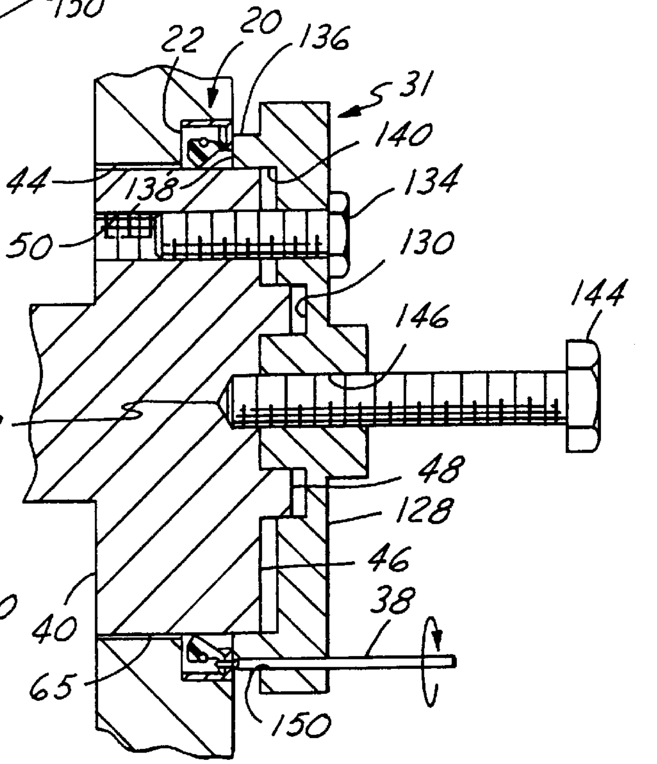
FIG. 8 is a sectional view showing the puller secured to the crankshaft and a drill for forming a hole in the sealing element.

Referring to FIGS. 7–9 and 13, the puller 31 is employed to withdraw the seal from the groove 22. The puller is a circular plate 128 having a central circular recess 130 on one side adapted to engage and receive the ring 48 on the end of the crankshaft as in FIG. 8. The plate 128 of the puller has a plurality of circumferentially spaced holes 132 for receiving bolts adapted to extend through the holes 132 and thread into the bolt holes 50 in the crankshaft. The holes 132 are circumferentially elongated to facilitate the attachment. The plate of the puller has on the side facing the engine block a rim 136 which is concentric with but of smaller diameter than the plate 128. The end surface 138 of the rim 136 is perpendicular to the longitudinal center line of the puller, and the radially inner surface 140 of the rim is cylindrical and of the same (or slightly larger) diameter as the outer surface 65 of the crankshaft. As shown in FIG. 8, the bolts 134 are tightened sufficiently to position the end surface 138 of the rim 136 in contact with the radial flange 56 of the frame 52 of the sealing element 22. A center bolt 144 threads through a threaded center hole 146 in the puller 31 and bottoms in the un-threaded socket 148 in the end face 46 of the end 42 of the crankshaft.

The plate 128 of the puller 31 has a plurality of circumferentially spaced holes 150 of equal diameter which are disposed radially outwardly of the rim 136 and hence do not extend through the rim. The holes 150 are aligned with the radial flange 56 of the sealing element 22 when the puller is attached to the crankshaft as in FIGS. 8 and 9.

As seen in FIG. 13, the drill 38 is extended through each of the holes 150 to form holes 160 in the radial flange 56 of the casing or frame 52 of the sealing element. The holes 160 in the flange 56 may also extend into the base 59 of the rubber seal 60 but not through the lip 62. The drill has the same diameter as the holes 150 and hence has a very close fit in the holes 150 and is thus closely axially and radially piloted by the holes and kept from straying or walking off line during drilling.

The drill 38 is removed and the self-tapping screws 36 are extended through the holes 150 in the puller and tapped into the holes 160 of the flange 56 of the frame of the sealing element. The hole 144 is now backed off, causing the puller 31 to withdraw from the crankshaft, thereby withdrawing the sealing element 20 from the groove 22, because the sealing element is attached to the puller by the screws 36.

Figure 9:
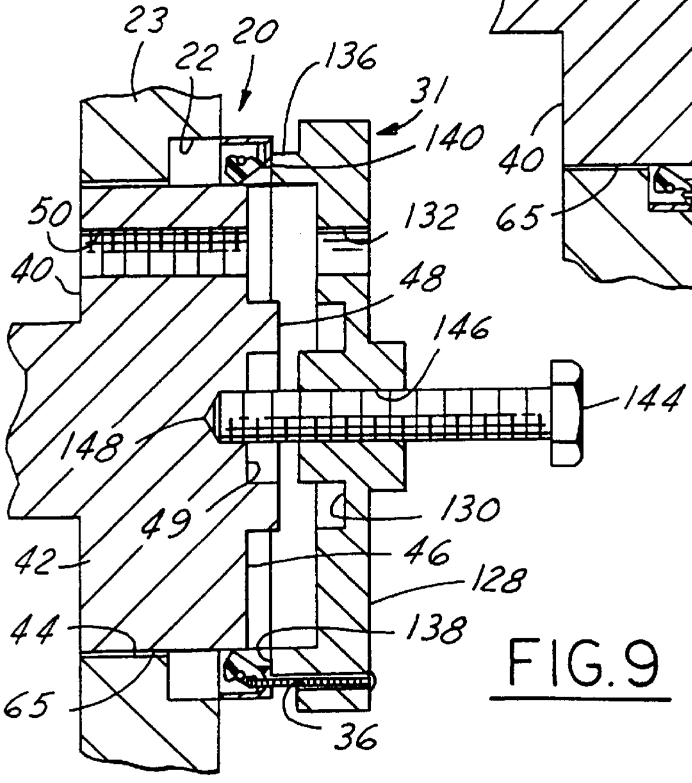
FIG. 9 is a view similar to FIG. 8 in which the drill is removed and a self-tapping screw is shown threaded into a hole formed in the sealing element by the drill.

The person removing the sealing element can view both the drilling operation as well as the installation of the screws, because the drill and screws are radially outwardly of the rim 136 as seen in FIGS. 8 and 9.

Figure 10:
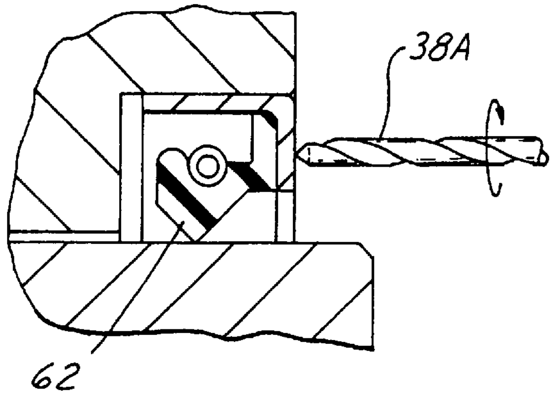
(PRIOR ART) FIG.10
FIGS. 10, 11 and 12 are views showing a drill for forming a hole in the sealing element in accordance with the prior art, in which the drill is unguided.
Figure 11:
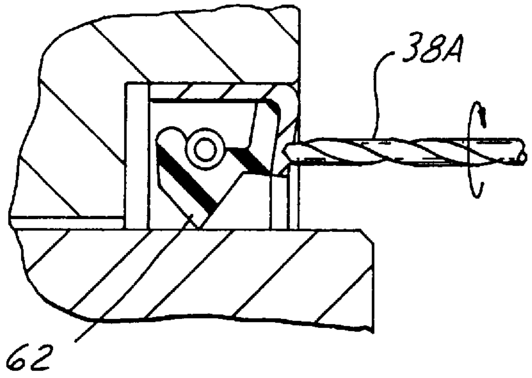
(PRIOR ART) FIG.11
Figure 12:
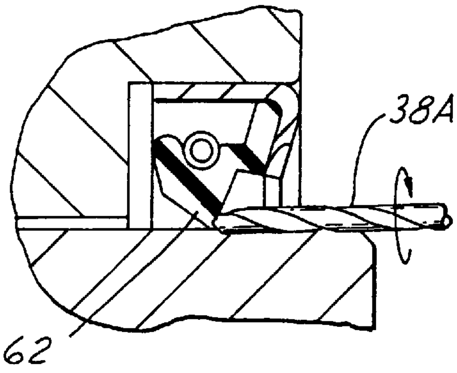
(PRIOR ART) FIG.12

FIGS. 10–12 shows holes being formed in the sealing element by a drill 38A which is unguided. As will be observed in the drilling sequence shown, the unguided drill walks off line, missing the frame of the sealing element and damaging the lip 62 as well as the smooth sealing surface of the crankshaft. The holes 150 in the puller 31 of this invention closely guide and pilot the drill so that the holes are correctly and accurately formed in the flange 56 of the frame of the sealing element, as intended and no damage to the seal lip or crankshaft results.

What is claimed is:

1. An apparatus for installing an annular oil sealing element in an outwardly opening annular groove of an engine block surrounding a cylindrical outer end of a crankshaft which extends through an opening in the engine block, such that the sealing element when in the groove, forms a seal between the groove and the cylindrical outer end of the crankshaft, wherein the outer end of the crankshaft has a transverse outer end face projecting from said opening, said apparatus comprising:

a guide plate adapted to be fitted against the transverse outer end face of the outer end of the crankshaft, said guide plate having a cylindrical radially outer wall of a diameter corresponding to the diameter of the cylindrical outer end of the crankshaft, means for removably locating the guide plate on the outer end face of the cylindrical outer end of the crankshaft in a position such that a first end of the cylindrical wall of the guide plate is concentric with and contacts the cylindrical outer end of the crankshaft, said guide plate having a frusto-conical wall extending axially outwardly and radially inwardly from a second end of said cylindrical wall to enable the sealing element to be stretched over the frusto-conical wall and slid along the cylindrical wall onto the cylindrical outer end of the crankshaft, further including an adapter having a radially outer cylindrical wall of a diameter corresponding to the diameter of the outer end of the crankshaft, means for securing the adapter to the outer end face of the outer end of the crankshaft, after removal of the guide plate therefrom, in a position such that the radially outer cylindrical wall of the adapter is concentric with the outer end of the crankshaft, a press having an annular skirt provided with a cylindrical inner wall of a diameter corresponding to the diameter of the outer end of the crankshaft and to the diameter of the radially outer wall of the adapter enabling said press to be engaged over the adapter with the cylindrical inner wall of said skirt in sliding contact with the cylindrical radially outer wall of the adapter and with the outer end of the crankshaft to move the sealing element along the outer end of the crankshaft and into the groove, and a bolt threaded in the adapter for moving the press toward the groove.

2. The Apparatus as defined in claim 1, wherein the cylindrical outer wall of said guide plate has an axial dimension of sufficient length to enable an operator to view the sealing element as it is slid therealong.

3. Apparatus as defined in claim 1, wherein the skirt of said press has a transverse end surface the radially inner portion of which is adapted to contact said sealing element and the radially outer portion of which is adapted to abut against a surface of the engine block.

4. Apparatus as defined in claim 3, wherein said end surface of the skirt is a flat, radially extending, continuous and unrecessed surface.

5. Apparatus as defined in claim 3, wherein the radially outer portion of the end surface of said skirt is recessed relatively to the radially inner portion thereof to enable the sealing element to be pressed further into said groove before the radially outer portion abuts the engine block.

* * * * *